United States Patent [19]

Crum et al.

[11] Patent Number: 5,725,252
[45] Date of Patent: Mar. 10, 1998

[54] PROMOTIONAL BOOKLET

[75] Inventors: Terrance R. Crum, Colorado Springs, Colo.; Frederick L. Reinbold, Jr., Grand Prairie, Tex.

[73] Assignee: Williamson Printing Corporation, Dallas, Tex.

[21] Appl. No.: 680,204

[22] Filed: Jul. 11, 1996

[51] Int. Cl.⁶ ............................................ G09B 29/00
[52] U.S. Cl. .......................... 283/34; 283/34; 283/35; 283/117; 281/2; 281/5; 281/46
[58] Field of Search ..................... 281/2, 5, 116; 283/34, 35, 61, 62, 117; 493/405, 947, 397, 399

[56] References Cited

U.S. PATENT DOCUMENTS

| | | | |
|---|---|---|---|
| Re. 34,759 | 10/1994 | Boyette | 281/29 |
| 102,189 | 4/1870 | Williams. | |
| 473,703 | 4/1892 | Kheiralla et al. . | |
| 475,661 | 5/1892 | Breinig . | |
| 512,882 | 1/1894 | Hillhouse . | |
| 867,613 | 8/1907 | Scragg . | |
| 1,009,687 | 11/1911 | Patton . | |
| 1,032,725 | 7/1912 | Africa et al. . | |
| 1,039,322 | 9/1912 | Rindall . | |
| 1,408,417 | 2/1922 | Soderberg . | |
| 1,426,631 | 8/1922 | Hachmann . | |
| 1,510,110 | 9/1924 | Schmidt . | |
| 1,755,742 | 4/1930 | Mattenklott . | |
| 1,853,622 | 4/1932 | Kennedy . | |
| 2,136,186 | 11/1938 | Frost | 281/29 |
| 2,316,786 | 4/1943 | Gottleib | 35/40 |
| 3,038,742 | 6/1962 | Leap | 281/29 |
| 3,565,462 | 2/1971 | Gottleib | 281/3 |
| 3,755,925 | 9/1973 | Court | 35/49 |
| 4,289,333 | 9/1981 | Gaetano | 283/35 |
| 4,810,007 | 3/1989 | Nam | 281/15 R |
| 4,878,776 | 11/1989 | Orlandini | 402/4 |
| 5,029,902 | 7/1991 | Komori | 283/56 |
| 5,104,146 | 4/1992 | Schulz et al. | 281/15.1 |
| 5,238,345 | 8/1993 | D'Andrea | 412/4 |
| 5,360,655 | 11/1994 | McDonald | 283/34 |
| 5,460,414 | 10/1995 | Sargis | 281/38 |
| 5,478,120 | 12/1995 | D'Abdrea | 283/117 |

FOREIGN PATENT DOCUMENTS

| | | | |
|---|---|---|---|
| 613092 | 11/1926 | France | 283/34 |
| 810214 | 12/1959 | United Kingdom | 283/34 |

*Primary Examiner*—Daniel W. Howell
*Assistant Examiner*—G. Albert Andoll
*Attorney, Agent, or Firm*—Jones, Day, Reavis & Pogue

[57] ABSTRACT

A promotional booklet having first and second separate compartments. In the first compartment is a plurality of information pages and in the second compartment is a rectangular sheet having a plurality of fold lines forming a plurality of individual panels that can be folded over each other such as a map. At least one panel on the rectangular sheet is attached to one of the second and third panels forming the second separate compartment. When the single rectangular sheet is folded to form a single panel in plan view, the entire promotional booklet forms only a single panel in plan view.

10 Claims, 1 Drawing Sheet

PROMOTIONAL BOOKLET

BACKGROUND OF THE INVENTION

1. Field of the Invention

The present invention relates generally to a booklet that can be used for promotional or advertising purposes and relates specifically to such a booklet having a plurality of information pages turnably attached in a first compartment, and a single folded rectangular sheet being attached to a second separate compartment of the novel booklet and having a plurality of fold lines forming a plurality of individual panels that can be unfolded to form a single sheet.

2. Description of Related Art Including Information Disclosed Under 37 CFR 1.97 and 1.98

There are many different types of booklets that are utilized as pocket guides, promotional booklets, cartographic devices, and the like. One such device disclosed in U.S. Pat. No. 512,882, patented Jan. 16, 1894, comprises a compass, a plurality of information pages, and a map formed of a single sheet having a plurality of fold lines such that the map can be folded to a single panel in plan view. Both the map, the information pages, and the compass are folded and located inside and between the front and back covers of the pocket guide.

It would be advantageous to have a promotional booklet in which a folded map or sheet is separated from a plurality of leaved pages by a Z-folded cover, in which both the map and the leaved pages are contained in separate adjoined compartments.

SUMMARY OF THE INVENTION

The present invention provides a promotional booklet having a book portion integrally formed from front and back covers, the front and back covers forming a first compartment. A plurality of turnable pages are attached to the book portion in the first compartment between the front and back covers. At least one additional panel is integrally formed with and extends beyond a fold line forming one edge of the back cover, and has an inside and an outside surface respectively co-extensive with the back cover inside and outside surface. The additional panel is foldable over the outside of the back cover along the fold line to form a Z shape and create a second separate compartment and to form only a single-panel booklet in a plan view of the front or back cover. A single information sheet having a plurality of panels folded over each other to form only a single panel in plan view is attached in the second separate compartment such that the plurality of panels forming the single information sheet may be folded over each other to be enclosed in the second separate compartment and unfolded as needed in conjunction with, or separate from, the plurality of pages in the first compartment.

This attachment of the single sheet, which may be a map, to the back cover allows the user to hold the booklet easily in one hand while unfolding the map with the other. Conversely, the attachment of the map to the back cover using two panels allows the user to easily refold the map with one hand and complete the refolding by closing the cover. By separating the map from the leaved pages in the book section with the use of first and second compartments, easy use of the pages is allowed without the map getting in the way or opening at the same time and being unwieldy. By separating the map from the leaved pages, the map is allowed to be uncluttered with information or advertising copy and the advertising copy, which makes the product economically feasible, is carried in the information pages in the first compartment that is separate from the map compartment. The information on the pages in the first compartment may relate to or explain features located on the map.

Further, the present device can be expanded by adding additional panels and folds to the cover, thereby creating additional compartments to contain additional maps or leaved page sections.

Thus, it is an object of the present invention to provide an improved promotional booklet that has a Z-shaped body portion forming two compartments in which, in one compartment, a plurality of pages can be placed for description, advertisement, and the like, while in the second separate compartment a single page can be placed having panels that can be folded. It may include a map or other information relating to the leaved pages.

It is still another object of the present invention to provide a promotional booklet in which leaved pages are formed in one compartment and a map portion is formed in another separate compartment.

It is still another object of the present invention to provide a promotional booklet in which additional panels could be added to the cover to create additional compartments for containing additional maps or individual page sections.

Thus, the present invention relates to a promotional booklet comprising a book portion having integrally formed front and back covers forming a first compartment, a plurality of pages attached to the book portion in the first compartment between the front and back covers, an inside surface on the back cover facing the plurality of pages, an outside surface on the back cover, and at least three edges on the back cover. At least one additional panel is integrally formed with and extends beyond a fold line forming one edge of the back cover and has an inside and an outside respectively co-extensive with the back cover inside and outside surface. At least one additional panel is foldable over the outside of the back cover along the fold line to create a second separate compartment and, when folded, to form only a single panel in a plan view of the back cover. A single information sheet having a plurality of panels that can be folded over each other to form only a single panel in plan view is fastened in the second separate compartment such that the plurality of panels forming the single information sheet may be folded over each other to be enclosed in the second separate compartment and unfolded as needed in conjunction with, or separate from, the plurality of pages in the first compartment.

BRIEF DESCRIPTION OF THE DRAWINGS

These and other objects of the present invention will be more fully disclosed when taken in conjunction with the following DETAILED DESCRIPTION OF THE PREFERRED EMBODIMENT in which like numerals represent like elements and in which.

DETAILED DESCRIPTION OF THE DRAWINGS

Figure 1:
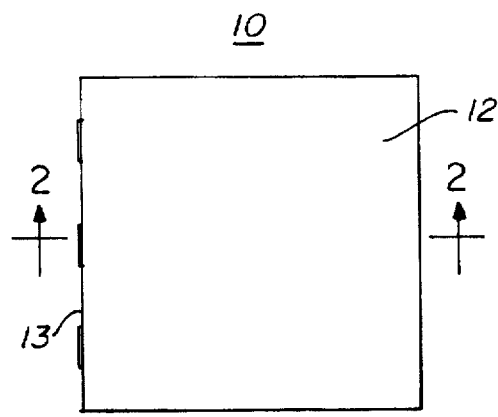
FIG. 1 is a plan view of the booklet illustrating its appearance as a single panel in the plan view.

As can be seen in FIG. 1, the novel promotional booklet 10 appears to be a single panel illustrated with a top panel 12.

Figure 2:
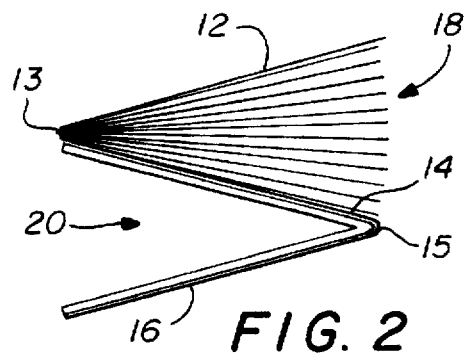
FIG. 2 is a cross-sectional view of the booklet of FIG. 1 taken along lines 2—2 and partially opened to illustrate the Z-shaped construction forming the two compartments.

However, as can be seen in FIG. 2, which is a cross-sectional view of the novel booklet taken along lines 2—2 of FIG. 1, the booklet 10 forms a generally Z shape in cross section having a top cover 12, back cover 14, and extended cover 16. The top fold or cover 12 and back cover 14 form a first compartment in which a plurality of loose pages 18 are attached in any well-known manner, such as by gluing or stapling. The second fold or back cover 14 and the extended cover 16 form a second compartment in which information such as a folded map 20 may be located. Thus, as can be seen in FIG. 2, the top cover 12 may be opened allowing pages 18 to be perused and, if desired, as will be shown more clearly hereafter in FIGS. 4 and 5, the extended cover 16 may be unfolded about the fold line 15 and the map 20 unfolded. It may be used separately from the pages 18 or in conjunction with the pages 18.

Figure 3:
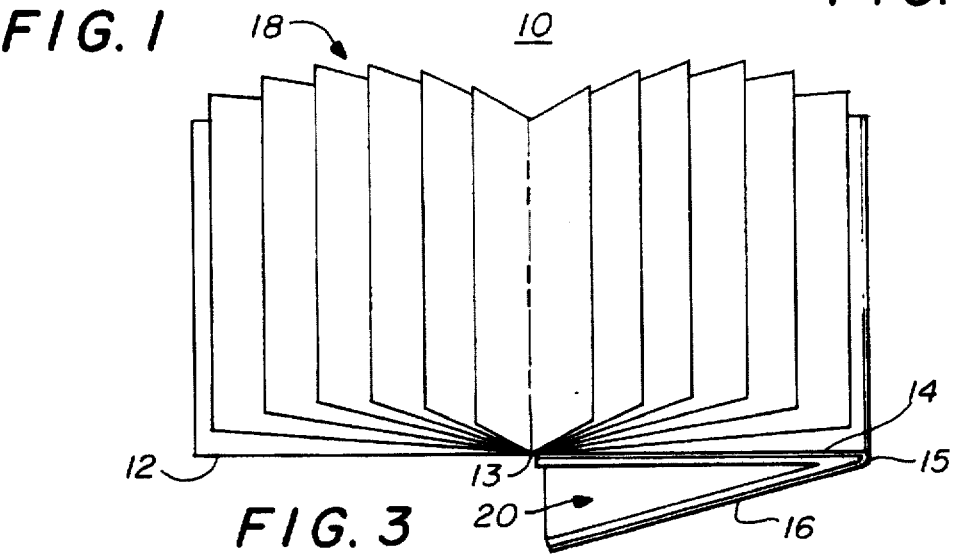
FIG. 3 is a partial isometric view of the novel promotional booklet of the present invention illustrating the first compartment being opened and illustrating the plurality of pages attached therein, with the map portion in the second compartment being in its folded state.

FIG. 3 is a perspective view of the novel promotional booklet 10 showing the top cover 12 and back cover 14 opened and the pages 18 individually exposed for perusal. Also as can be seen in FIG. 3, the extended cover 16 is partially pivoted about fold line 15 to reveal map 20 that is still folded therein.

Figure 4:
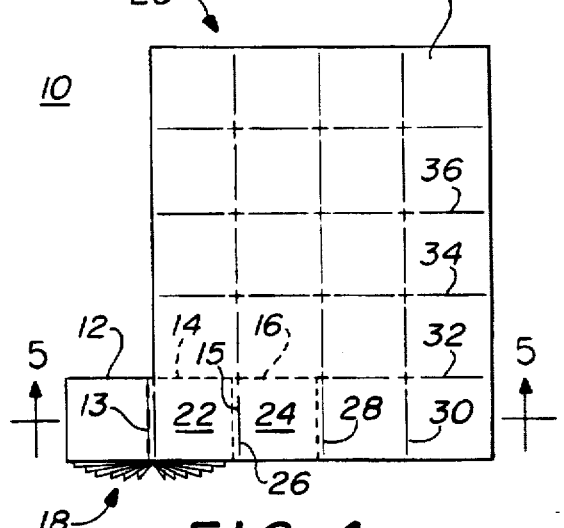
FIG. 4 illustrates the novel promotional booklet in its opened state or condition with the map being unfolded and with the plurality of pages in the other compartment shown being spread apart.

FIG. 4 illustrates the novel promotional booklet 10 with the map 20 unfolded. As can be seen, the map 20 is a single sheet having a plurality of panels such as 22, 24, and 25 separated by a plurality of fold lines 26, 28, 30, 32, 34, and 36. It will be noted that panels 22 and 24 are attached in any well-known manner, such as by gluing, to the outer surfaces of booklet panels 14 and 16. Pages 18, of course, are extending downwardly from the other side of the booklet.

Figure 5:
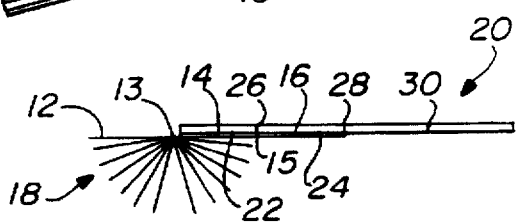
FIG. 5 is a cross-sectional view of a portion of FIG. 4 taken along lines 5—5.

FIG. 5 is a partial cross-sectional view taken along lines 5—5 of FIG. 4 and illustrates the front cover 12 separated from back cover 14 by a fold line 13 and the plurality of individual leaved pages 18 extending downwardly therefrom. It can also be seen in FIG. 5 that two panels 22 and 24 of map 20 are attached in any well-known manner, such as by gluing, to the outer surfaces of back cover 14 and extended panel 16 of the booklet 10.

Thus, clearly, as can be seen in FIGS. 1–5, the book has a cover formed of first, second and third integrally formed panels 12, 14, and 16, that are foldable in a Z shape as shown in FIG. 2. The first and second panels 12 and 14 form one compartment when folded about fold line 13, and the second and third panels 14 and 16 form a second separate compartment when folded about fold line 15. A plurality of informational pages 18 are turnably attached in the first compartment between the first and second panels 12 and 14. A rectangular sheet 20 having a plurality of fold lines such as 26, 28, 30, 32, 34, and 36 forms a plurality of individual panels such as 22, 24, and 25 that can be folded to form only two adjacent panels such as 22 and 24, as can be seen in FIG. 5. The two adjacent panels 22 and 24 are attached, such as by gluing, in the second compartment to corresponding ones of the second and third Z-shaped cover panels 14 and 16 such that, when the cover is folded in a Z shape as shown in FIG. 2, only a single panel 12 is formed in plan view as shown in FIG. 1 so as to allow the information pages 18 in the first compartment to be turned without exposing the rectangular sheet 20 while allowing the rectangular sheet 20 in the second compartment to be unfolded without exposing the information pages 18 or to use both the information pages 18 and the rectangular sheet 20 in both compartments simultaneously as illustrated in FIG. 4.

As indicated earlier, the preferred use of the rectangular sheet 20 is as a map which may be related to the information set forth in the interleaved pages 18.

Figure 6:
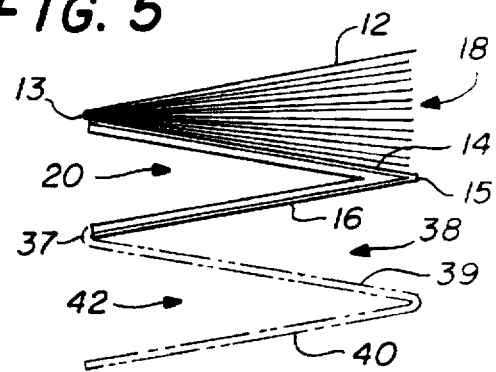
FIG. 6 is an end view of the novel promotional booklet of the present invention illustrating additional panels and folds being added to the cover to thereby create additional compartments that can contain additional maps or leaved page sections.

As can be seen in FIG. 6, at least one additional fourth panel 39 may be integrally formed with and extend from the third panel 16 by means of fold line 37 such that, when the third and fourth panels 16 and 39 are folded against each other, a third separate compartment 38 is formed. Further information such as printed matter in the form of a plurality of pages or a single page folded as a map may be attached to the cover panel 16 and/or 39 in the third separate compartment 38. Clearly, still further additional panels such as shown in phantom lines 40 could be integrally formed with and extend from panel 39 to form an additional separate compartment 42.

Clearly, the first and second compartments could both contain individual leaved pages only or maps only. In FIG. 6, the multiple compartments could all contain either maps only or leaved pages only or any combination thereof.

Thus, there has been disclosed a promotional booklet that has a book portion with integrally formed front and back covers forming a first compartment and a plurality of pages attached to the book portion in the first compartment between the front and back covers. The back cover has an inside facing the plurality of pages, an outside, and at least three edges. At least one additional panel is integrally formed with and extends beyond a fold line forming one of the edges of the back cover and having an inside and outside respectively co-extensive with the back cover inside and outside. At least one additional panel is foldable over the outside of the back cover along the fold line to create a second separate compartment, and to form only a single panel in a plan view of the front or back cover. A single information sheet has a plurality of panels that can be folded over each other to form only a single panel in plan view. This information sheet may be a map formed on the single sheet but foldable by means of panels to form only the single panel in the plan view. At least one of the panels on the single information sheet is attached in the second separate compartment such that the plurality of panels forming the single information sheet may be folded over each other to be enclosed in the second separate compartment and unfolded as needed in conjunction with, or separate from, the plurality of pages in the first compartment. The information sheet may be attached as by means of adhesive or staples.

The corresponding structures, materials, acts, and equivalents of all means or step plus function elements in the claims below are intended to include any structure, material, or act for performing the function in combination with other claimed elements as specifically claimed.

We claim:

1. A promotional booklet comprising:

a cover having first, second, and third integrally formed panels foldable in a Z shape, said first and second panels forming one compartment when folded over each other and the second and third panels forming a second separate compartment when folded over each other;

a plurality of information pages turnably attached in the first compartment between the first and second panels;

a rectangular sheet having a plurality of fold lines forming a plurality of individual adjacent panels that can be folded to form only one panel in plan view; and attachment means for fastening each of the two adjacent panels of the rectangular sheet in the second compartment to a corresponding one of the second and third Z-shaped cover panels such that, when the panels are folded in a Z shape, only a single panel is formed in plain view so as to allow the information pages in the first compartment to be turned without exposing the rectangular sheet, the rectangular sheet in the second compartment to be unfolded without exposing the information pages, or to use both the information pages and the rectangular sheet in both compartments simultaneously.

2. A promotional booklet as in claim 1 wherein said rectangular sheet is a map.

3. A promotional booklet as in claim 2 further comprising information in said booklet pages that is related to said map.

4. A promotional booklet as in claim 1 further comprising:

at least one additional fourth panel integrally formed with and extending from the third panel such that, when the third and fourth panels are folded, a third separate compartment is formed; and printed matter being attached to the cover panels in the third separate compartment.

5. A promotional booklet as in claim 4 wherein the printed matter is a further plurality of information pages.

6. A promotional booklet as in claim 4 wherein the printed matter is an additional map.

7. A promotional booklet comprising:

a book portion having integrally formed front and back covers forming a first compartment;

a plurality of pages attached to the book portion in the first compartment between the front and back covers;

said back cover having an inside facing the plurality of pages, an outside, and at least three edges;

at least one additional panel integrally formed with and extending beyond a fold line forming one edge of the back cover and having an inside and outside respectively co-extensive with the back cover inside and outside;

said at least one additional panel being foldable over the outside of the back cover along the fold line to create a second separate compartment and to form only a single panel in a plan view of the back cover;

a single information sheet having a plurality of panels that can be folded over each other to form only a single panel in plan view; and attachment means for fastening at least one of the information sheet panels in the second separate compartment such that the plurality of panels forming the single information sheet may be folded over each other to be enclosed in the second separate compartment and unfolded as needed in conjunction with, or separate from, the plurality of pages in the first compartment.

8. A promotional booklet as in claim 7 wherein at least one of the plurality of panels of the single information sheet is attached to a selected one of the outside of the back cover or the inside of the one additional panel to enable a folded information sheet to be located in the second separate compartment.

9. A promotional booklet as in claim 7 wherein each of at least two adjacent ones of said plurality of panels of said single information sheet are attached to a corresponding one of the inside of said back cover and said additional panel to enable a folded information sheet to be located in the second separate compartment formed by the folded back cover and the one additional panel.

10. A promotional booklet as in claim 7 wherein the attachment means is an adhesive.

* * * * *